Figure 1:
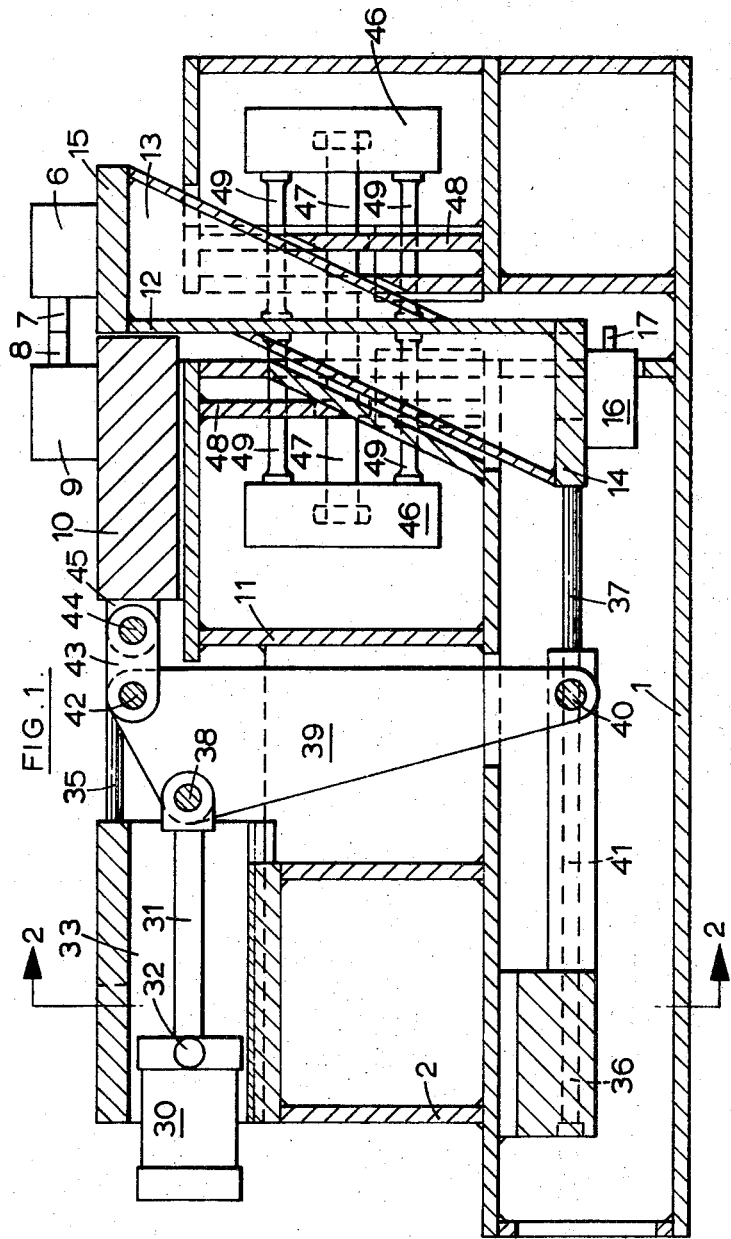

United States Patent [19]

Searle et al.

[11] 3,840,168

[45] Oct. 8, 1974

[54] FRICTION WELDING APPARATUS

[75] Inventors: John Gilbert Searle, Hednesford; David John Hunt, Rugeley, both of England

[73] Assignee: Allwood, Searle & Timney (Holdings) Limited, Staffordshire, England

[22] Filed: Oct. 27, 1972

[21] Appl. No.: 301,498

[30] Foreign Application Priority Data
Oct. 27, 1971 Great Britain.................. 4832/71

[52] U.S. Cl................................... 228/2, 29/470.3
[51] Int. Cl........................................... B23k 27/00
[58] Field of Search.......... 228/2; 29/470.3; 156/73, 156/580

[56] References Cited
UNITED STATES PATENTS

| | | | |
|---|---|---|---|
| 3,058,513 | 10/1962 | Schaub et al. | 156/73 X |
| 3,542,275 | 11/1970 | Loyd et al. | 228/2 |
| 3,699,639 | 10/1972 | Ditto et al. | 228/2 X |
| 3,705,678 | 12/1972 | Searle | 29/470.3 X |

*Primary Examiner*—J. Spencer Overholser
*Assistant Examiner*—Robert J. Craig
*Attorney, Agent, or Firm*—Scrivener Parker Scrivener & Clarke

[57] ABSTRACT

In a known type of friction welding apparatus one of the components to be welded is held stationary and the other is oscillated that is, reciprocated or repeatedly moved about a closed path without rotation which is referred to as "irrotational movement". The components are urged together by hydraulic or other pressure means while heat is generated frictionally and subsequently while welding is effected. A feature of the disclosure is the provision of at least one flexible element fast with the irrotationally moving part and fast with a non-oscillating frame, the element transmitting at least some of the reaction to force exerted by the pressure means. Another feature is the provision of at least one flexible and resilient element fast with the irrotationally moving part and fast with some other part such as a counterweight and tending to reduce the amplitude of irrotational movement. Another feature is the provision of a base which supports the remainder of the apparatus in such a manner that said reaction is not transmitted through the base irrotationally moving part being located relatively to the base by at least one element fast with said part and with the base.

6 Claims, 5 Drawing Figures

FRICTION WELDING APPARATUS

This invention relates to friction welding apparatus.

In effecting friction welding two components to be welded together are brought into contact and their abutting faces are rubbed together until sufficient heat is generated to enable welding to be effected. The components are then brought into the desired alignment, if they are not already aligned in the desired manner, and are welded together with the application of an appropriate welding force. The welding force is usually, but not always, greater than the force urging the faces into abutment during the generation of heat by friction.

It has been proposed to generate frictional heat for welding by moving one component relatively to the other, without relative rotation, while the faces of the two components are urged into contact. One component is normally held stationary while the other component is urged against it and is caused either to reciprocate along a linear path in the plane of the abutting faces of the components or to follow repeatedly a closed path, such as a circular path, in that plane. When sufficient heat for welding has been generated the components are quickly brought into the desired relationship and are welded together. This type of friction welding will hereinafter be referred to as "irrotational". As will become apparent from what follows, the present invention is concerned with irrotational friction welding apparatus. Some types of irrotational friction welding apparatus are such that in use one of the components in the course of its oscillations rocks to and fro relatively to the other component through a small angle about an axis or axes normal to the principal plane of the rubbing faces of the components to be welded together. It is to be understood that such movement is not considered as consitituting significant relative rotation and that any apparatus causing movement of this kind constitutes irrotational friction welding apparatus.

It will be appreciated that during the frictional generation of heat in an irrotational friction welding process a component support is caused to oscillate without rotation. This component support may include a chuck or similar device for gripping one of the components to be welded. Alternatively the components support may merely comprise a table or the like to which such a chuck or other device can be secured. Reference will be made in this specification to oscillating means, and it is to be understood that this refers to this component support, any component mounted on that component support, and any other parts of the apparatus, such as counterweights, which are secured or linked directly or indirectly to the component support so as to oscillate with it.

Irrotational friction welding may be used to weld together components of various different types of materials. The components may for example be formed of a thermoplastic material or of a metal or they may be formed of different thermoplastic materials or of different metals. The invention has largely been developed with a view to overcoming problems which arise in the design or irrotational friction welding apparatus for use in welding together components of the same metal or of different metals, but the invention is also applicable to irrotational friction welding apparatus for use in welding together components of other materials.

In typical apparatus for the irrotational friction welding of metal components the component support oscillates at between 3,000 and 5,000 oscillations per minute with a maximum displacement of ⅛ inch to ½ inch from a mean position. The components to be welded together may be urged towards each other with a force of for example 5 tons. The direction in which the force is applied will hereinafter be referred to as the axial direction. The component support thus moves rapidly with a relatively small displacement under a relatively large axial load. The reaction to the axial load at the rubbing faces of the components has to be transmitted from the oscillating means to some non-oscillating part of the apparatus hereinafter referred to for convenience as the "frame" of the apparatus. Existing types of bearings, such as hydrostatic bearings, are found to be rather unsuitable for the transmission of these reaction forces, and an aim of the present invention is to overcome or at least reduce the difficulties associated with such conventional types of bearings.

From one aspect the present invention consists in friction welding apparatus of the kind capable of welding a first component and a second component together and comprising frame means, oscillating means movable in an irrotational manner relatively to said frame means, a first component support for supporting said first component and constituting part of said oscillating means, a second component support for supporting said second component and restrained against irrotational movement, drive means operative to cause said oscillating means to perform said irrotational movement relatively to said frame means and to said second component support, pressure means operative to generate a force urging said component supports in an axial direction normal to irrotational movement and such that in use components supported by said component supports are urged together, and reaction means for transmitting the reaction to said force from the oscillating means to said frame means, characterised in that the reaction means comprises at least one flexible element one end of which is fast with the frame means and the other end of which is fast with the oscillating means.

The element of each of the elements may be in tension or compression when the apparatus is in use. Where there are a plurality of elements some may be in tension and some in compression. If the element or any element is in compression it is of course necessary to ensure that the element has sufficient stiffness to avoid its buckling in use. In any particular circumstances the appropriate dimensions of the element or of each element can be gauged from the equations derived in the well known theory of the flexing of beams which are anchored at each end and to which longitudinal buckling forces are applied.

When it is stated that an end of the element or each element is fast with a particular part of the apparatus it is to be understood that this means that the end of that element is not movable relatively to that part. The end of the element may be formed integrally with that part or may be secured to it in an immovable manner.

It will be appreciated that when apparatus embodying that aspect of the invention outlined above is in use the first component support will move very slightly towards and way from the frame means or the other part of the apparatus to which it is linked by the element or elements, when the element or each element is flexed. This axial movement of the first component support can readily be made negligibly small by making the length of the element or of each element very much greater than the maximum displacement of that component support during the frictional generation of heat. If, for example, the element or each element is 20 inches long and the maximum displacement is one quarter of an inch the total axial movement will be about three thousandths of an inch. Where the first component support moves in a circular path this axial movement will not occur during the circular movement and will only occur when the components are axially aligned after the frictional generation of heat and before welding occurs.

Where the apparatus is such that the first component support oscillates in a rectilinear path, then the element or each element may be such as to flex relatively readily in the direction of movement, while being so shaped as strongly to resist flexing in any other direction. For example the element or each element may be of blade-like shape. Where the apparatus is such that the first component support moves in other than any rectilinear path, however, the element or each element is preferably such that its resistance to flexing is independent of the direction of movement of the first support. To this end the element or each element is preferably of circular cross-section. Nevertheless it would be possible for the element or each element to be of some other shape. In particular the element or each element could comprise two similar elongated portions of each blade-like shape, the two portions being secured together end-to-end with their main planes at right angles to each other.

It is a property of elements used in this manner that the strength in compression or tension is proportional to the total cross-sectional area of the element or elements. Thus, for any given maximum reaction force to be transmitted by the element or elements a suitable cross-sectional area can be determined. Where there are a plurality of elements of circular cross-section, however, it can readily be shown that for a given total cross-sectional area the stiffness of the combined elements decreases with the number of elements used. That is, a single rod of circular cross-section is relatively stiff, while a larger number of thin rods or strands of circular cross-section, the total cross-section being the same as that of the single rod, will have a combined stiffness very much less than that of the single rod. It is therefore possible to use elements of widely differing kinds in apparatus embodying the present invention. There may, for example, be a few relatively thick rods of circular cross-section, or there may be a set of thin parallel wires, or even a wire rope. The latter forms of elements can, of course, only be used in tension, as the relatively thin elements would buckle in compression.

The total cross-sectional area of the element or elements would normally be chosen so as to avoid undue strain on the element or elements. In particular the loading would normally be such that neither the limit of proportionality or the yield point was approached at all closely. It is desirable that the element or elements should be made of a material or materials having low hysteresis, so that there is no tendency for heat to be generated in the element or elements during use of the apparatus.

Elements of the kind described above may also be used to overcome or reduce another problem which may arise in irrotational friction welding apparatus. This concerns the balancing of the radial forces which arise when the oscillating means is performing oscillatory movement. The present applicants have already proposed the use of a counterweight coupled to the first component support in such a manner as to move in opposition to that support, the first component support and the counterweight both forming part of the oscillating means. Further, although the first component support is normally driven directly it is possible for the counterweight to be driven and for the first component support to follow the movement of the counterweight. In either case the arrangement is preferably symmetrical in that the mass of the first component support is equal to the mass of the counterweight, the displacements of the first component support and the counterweight being equal and opposite.

In the preferred construction, already proposed by the present applicants, the counterweight comprises a pair of equal parts spaced one on each side of the first component support in an axial direction (that is in a direction parallel with the direction of application of the axial forces); and the counterweight parts are constrained to move in directions normal to the axial direction. The arrangement is such that when the first component support and the counterweight as a whole are in their mean positions, the axes of the components to be welded being aligned, the centres of gravity of the first component support and of the counterweight are co-incident. A stationary part of the apparatus is disposed between the first component support and each of the counterweight parts. The first component support and the counterweight parts are interconnected by a link or links. Each end of each link is formed with a part-spherical convex bearing surface which engages a complementary concave bearing surface which engages a complementary concave bearing mounted for axial sliding movement in either the first component support or in the counterweight part concerned. An intermediate part of the link or of each link is mounted for universal rocking movement relatively to the stationary part of the apparatus. Where the rocking centre is half-way between the centres of the part-spherical convex bearings the movement of each counterweight part is equal and opposite to that of the first component support.

The purpose of the counterweight is to balance the main translational forces which would otherwise be transmitted to the stationary part of the apparatus. Thus, when the apparatus is in use, there is little or no remaining tendency for the apparatus to shift bodily as a whole. Nevertheless, there remains a tendency for the amplitude of oscillation to increase, a tendency which has hitherto been resisted by radial reaction forces transmitted to the first component support through the means for causing the oscillating means to oscillate. The applicants' British Patent Application Cognate Nos. 4397/71 and 12271/71 (equivalent to U.S.A application No. 225,254 now Patent No. 3,777,967) mentions this problem and provides apparatus such that the radial reaction forces are transmitted from the stationary part of the apparatus to the oscillating means through the intermediary of the wedge-shaped drive members, so as to reduce greatly the proportion of the force transmitted through the device for causing the drive members to reciprocate.

A further aim of the present invention is to provide means for reducing the tendency for the amplitude of oscillation to increase.

From another aspect the present invention consists in friction welding apparatus of the kind capable of welding a first component and a second component together and comprising frame means, oscillating means movable in an irrotational manner relatively to said frame means, a first component support for supporting said first component and constituting part of said oscillating means, a second component support for supporting said second component and restrained against irrotational movement, drive means operative to cause said oscillating means to perform said irrotational movement relatively to said frame means and to said second component support, and pressure means operative to generate a force urging said component supports in an axial direction normal to said irrotational movement and such that in use components supported by said component supports are urged together, characterised in that there is provided restraining means for at least partially counteracting the inertial forces generated by said irrotational movement, which restraining means comprises at least one flexible and resilient element one end of which is fast with the oscillating means and the other end of which is fast with a part relative to which said one end performs irrotational movement when the apparatus is in use, the element being flexed resiliently when the apparatus is in use and exerting forces tending to reduce the amplitude of the irrotational movement.

In general this aspect of the invention only makes use of a single element or a plurality of elements the individual cross-sections of which are relatively large so as to provide significant stiffness.

It may happen that a particular component mounted on the first component support may be of a weight different from that of the previous components, or that the speed of oscillation may vary slightly or that some other variation may occur which will alter the magnitude of the radial reaction forces. In order to allow for this the element or each of the elements transmitting these forces is preferably such that its stiffness can be adjusted. For example an element may comprise a rod and a tube fitted together telescopically, means being provided to enable the extent to which the rod projects into the tube to be adjusted.

In a preferred arrangement the first component support is coupled to the counterweight or each of the counterweight parts by an element or a set of elements of the kind described. The element or set of elements then provides a force trying at all times to reduce the amplitude of oscillation to zero. Alternatively, however, the first component support may be connected to a non-oscillating part of the apparatus through the intermediary of such an element or set of elements. This latter arrangement is normally unnecessary, however, and only adds to the complexity and causes a resultant local bending moment to be applied to the non-oscillating part or parts.

The element or elements would not normally transmit any significant longitudinal forces. Nevertheless, it is within the scope of the invention to provide elements which serve both to transmit the axial reaction forces and to transmit the radial forces arising from the oscillation of the oscillating means. Thus, it would be theoretically possible to provide an apparatus of the general kind outlined above having a first component support and a counterweight, in which the first component support was connected by one set of elements to one of the counterweight parts, and this counterweight part (which forms part of the oscillating means) was connected by another set of elements to a stationary part of the apparatus. The axial forces would then be transmitted to the stationary part through both sets of elements, and both sets of elements would play a part in opposing the radial forces. Such a construction would fall within the scope of both of the aspects of the invention outlined above.

It can readily be shown that the use of one or more relatively stiff elements to transmit the radial forces arising from the oscillation of the oscillating means can yield a further advantage of considerable value. It can in fact be shown that for any given rate of oscillation, and any given masses of oscillating means, the radial reaction forces can be substantially completely absorbed for any amplitude of oscillation. In other words, if the arrangement is such that the radial reaction forces are completely absorbed during the frictional generation of heat then the radial reaction forces do not reappear during the reduction in amplitude of oscillation preparatory to the alignment of the components for the application of the welding force. Similarly, if the radial reaction forces are only partially counteracted by the presence of the element or elements the proportion of the forces counteracted by such presence remains constant, irrespective of the amplitude of oscillation.

The frame means referred to above may constitute the base of the apparatus, in which case the reaction forces may tend to cause the base to warp. Another aim of the invention is to avoid or at least reduce this difficulty.

From a further aspect the present invention consists in friction welding apparatus of the kind capable of welding a first component and a second component together and comprising a base, oscillating means movable in an irrotational manner relatively to said base, a first component support for supporting said first component and constituting part of said oscillating means, a second component support for supporting said second component and restrained against irrotational movement relative to said base, drive means operative to cause said oscillating means to perform said irrotational movement relatively to said base and to said second component support, pressure means operative to generate a force urging said component supports in an axial direction normal to said irrotational movement and such that in use components supported by said component supports are urged together, and reaction means for transmitting the reaction to said force between said first and second component supports, characterised in that said reaction means does not operate through the intermediary of said base, and that said first component support is located relatively to the said base by at least one flexible element one end of which is fast with said base and the other end of which is fast with siad oscillating means.

As the reaction to the force generated by the pressure means is not transmitted through the base there is no resultant force on the base. Nevertheless there is need to locate the other parts relative to base, and in the apparatus characteristic of the invention this is effected by one or more flexible elements. This element or each element does not normally transmit any significant longitudinal force and further it need not exert any forces tending to reduce the amplitude of the oscillations.

Figure 2:
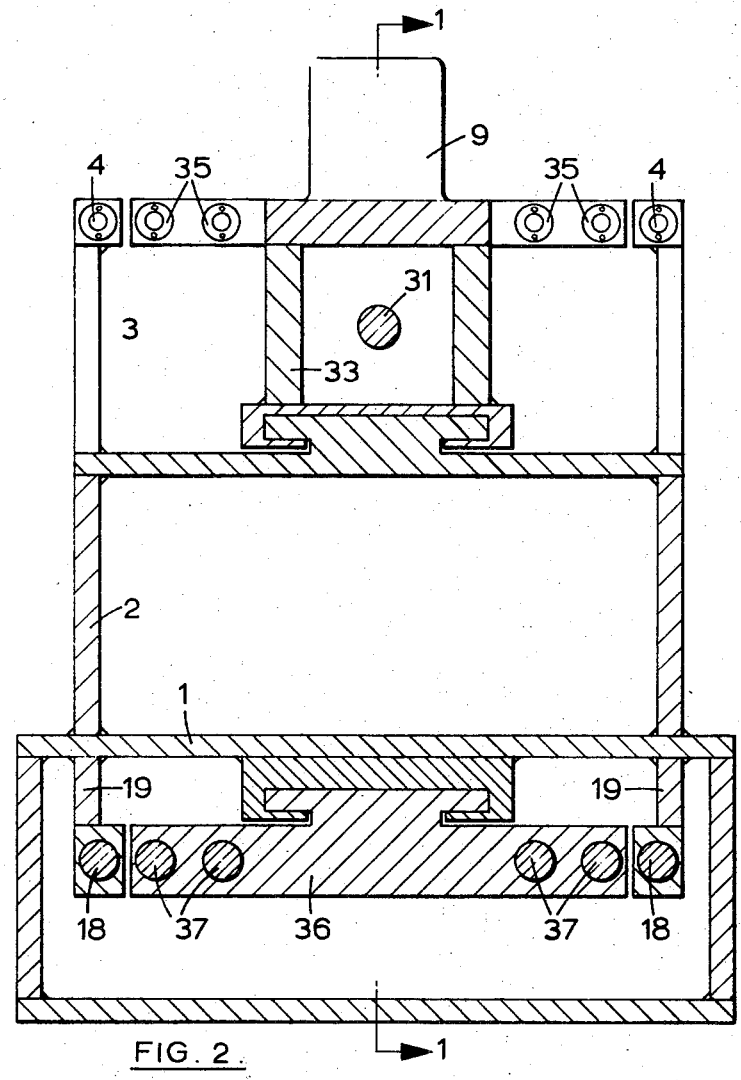
Figure 3:
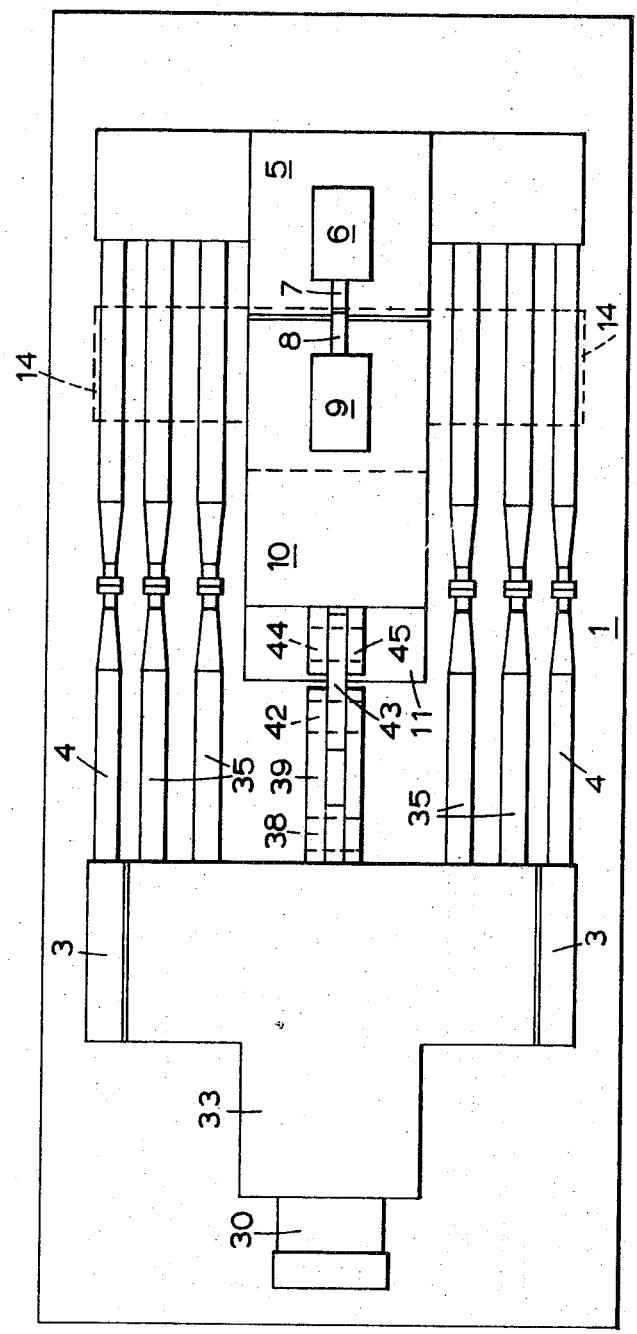
Figure 4:
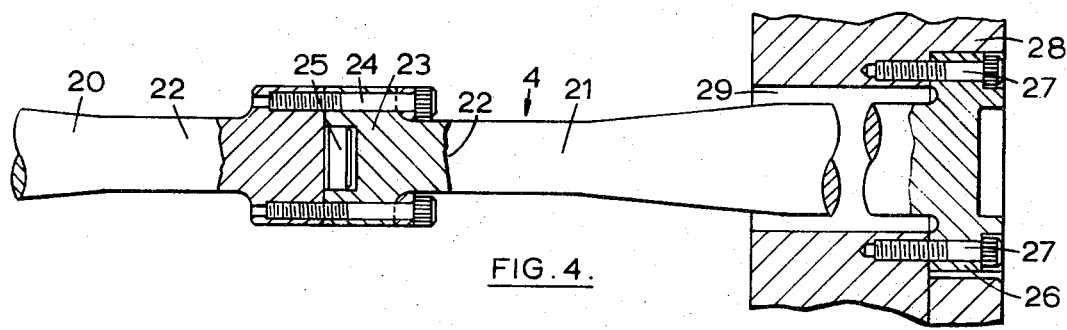
Figure 5:
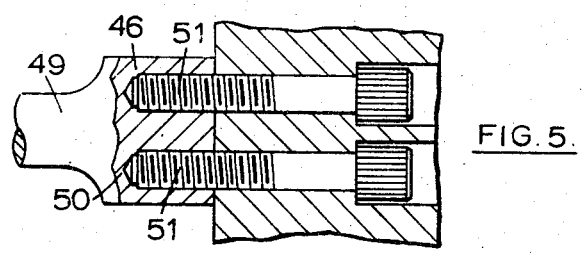

The invention will now be more particularly described with reference to the accompanying drawings, in which:

FIG. 1 is a section through friction welding apparatus embodying all three aspects of the invention, the section being substantially along the line 1—1 of FIG. 2, certain parts being omitted for clarity, FIG. 2 is a section to a larger scale along the line 2—2 of FIG. 1, certain parts also being omitted for clarity, FIG. 3 is a somewhat simplified plan view of the apparatus, FIG. 4 is a side view to a larger scale of one of the elements incorporated in the apparatus, parts being broken away to reveal the manner in which the element is secured in position, and FIG. 5 is a section to a larger scale illustrating the manner in which another of the elements is secured in position.

The apparatus comprises a base 1 fabricated from steel plate. The lowermost part of the base 1 is shaped as a shallow, closed box of rectangular shape in plan, and there are several other parts upstanding from that lowermost part. Towards one end of the apparatus there is an upstanding part 2 of the base 1, the part 2 again being of box-like shape. Rising from opposite sides of the part 2 are two parallel plates 3 each of which forms an anchorage for one end of a longitudinal element 4. The two elements 4 are parallel with each other and extend in a horizontal direction towards the other end of the apparatus where their ends are anchored to a top plate 5. The details of the elements 4 and their anchorage will be described below in greater detail with reference to FIG. 4.

The top plate 5 carries a chuck 6 which is illustrated as holding a component 7, which is one of the two components which are to be welded together. The other component 8 is held by a chuck 9 mounted on a slide 10. The slide 10 is mounted for sliding movement in a horizontal direction, on another upstanding part 11 of the base 1.

Depending from one edge of the top plate 5 is a main plate 12, the central plane of the main plate 12 being co-planar with the mutually abutting end faces of the components 7 and 8 which are to be welded together. A buttress formation 13 extends between the top plate 5 and the main plate 12. In order to bring the centre of gravity of these parts to the centre of the main plate 12 there is a bottom plate 14 similar to the top plate 5, and a buttress formation 15 similar to the formation 13. There is also a chuck 16 similar to the chuck 6, and provided with a blank component 17 similar in shape and weight to the component 7.

Flexible elements 18 similar to and parallel with the elements 4 are anchored to the bottom plate 14 and extend inside the lowermost part of the base 1 to anchorages afforded by depending plates 19. The elements 4 and 18 are of the same length, but the elements 18 are mounted somewhat to the left of the elements 4 as viewed in FIG. 1.

The elements 4 and 18 serve to locate the main plate 12, and the parts fixed to it, relatively to the base 1. As the elements 4 and 18 are flexible the plate 12 and said parts can be caused to oscillate substantially in a plane normal to the axes of the elements. When such oscillation occurs the elements flex resiliently. The construction of each element is illustrated in FIG. 4. Each element comprises two similar portions 20 and 21. The main central part of each portion is cylindrical, but one end part is tapered to a part 22 of reduced diameter which terminates in a flange 23. The two parts 20 and 21 are bolted together with bolts 24 which enter aligned holes in the flanges 23. The portion 20 has a locating boss 25 on its end face which enters a complementary socket in the end of the portion 21.

At the outer end of each portion there is an outwardly directed annular flange 26 which is formed with bolt holes which receive bolts 27 which secure the flange to the adjacent part 28 of the apparatus. It will be observed that the hole 29 in the part 28 through which the element extends is of rather greater internal diameter than the external diameter of the adjacent part of the element; this allows unrestricted flexing of the element when the apparatus is in use. The diameter of the flanges 23 is also less than the internal diameter of the holes 29 so that the portion 20 and 21 can be passed through the holes during manufacture and can then be secured together by means of the bolts 24.

The component 8 can be urged into engagement with the component 7 by means of an hydraulic piston-and-cylinder unit having a cylinder 30 and piston rod 31. The cylinder 30 has trunnions 32 by means of which it is pivotally mounted in a hollow slide 33 mounted for axial sliding movement on the upstanding portion 2 of the base 1. The slide 33 is constrined against movement in any other direction. The slide 33 is connected to the top plate 5 by four elements 35 which is parallel and co-planar with the elements 4. The elements 35 are similar in construction to the elements 4, and are of the same length, but of rather larger diameter. Between the depending plates 19 is another slide 36, which is constrained to move in a direction parallel to the slide 33. The slide 36 is linked to the bottom plate 14 by elements 37 exactly similar to the elements 35.

The piston rod 31 is pivotally connected at 38 to one corner of a triangular plate assembly 39 comprising two spaced, parallel triangular plates. The lowermost corner of the plate assembly 39 is pivotally connected at 40 to an arm 41 which extends longitudinally from the slide 36 and is integral with that slide. The uppermost corner of the plate assembly 39 is pivotally connected at 42 to one end of a short link 43 the other end of which is pivotally connected at 44 between a pair of lugs 45 fixed to the slide 10.

When the piston-and-cylinder unit is operated to urge the piston rod 31 from the cylinder 30 the slide 10 is urged to the right as shown in FIG. 1 while the slide 33 is urged to the left. The component 8 abuts the component 7 and urges the latter to the right, but this movement is restrained by the elements 35 which link the top plate 5 to the slide 33. Thus the reaction to the force exerted by the unit is urging the components 8 and 7 together is largely carried by the elements 35.

A feature of the design of the apparatus is that the chucks 6 and 9 are secured to flat-topped parts 5 and 10, and that there are no projections above those parts. As a consequence the force exerted by the component 8 on the component 7 is above the level of the reaction forces carried by the elements 35. Thus a torque is applied to the main plate 12 which tends to urge the bottom part of that plate to the left as viewed in FIG. 1. The force exerted by the bottom part of the main plate 12 is, however, transmitted to the slide 36 and thence to the arm 41 where it is balanced by a force directed to the right and transmitted through the triangular plate assembly 39 from the piston-and-cylinder unit. Thus the main plate 12 is held in equilibrium.

The slides 33 and 36, which constitute the frame means of the apparatus, transmit no significant reaction forces to the base 1, so that operation of the piston-and-cylinder unit does not tend to distort the base. The entire assembly affected by the piston-and-cylinder unit is in fact located longitudinally solely by the elements 4 which transmit no longitudinal forces to the base 1.

The assembly comprising the main plate 12 and the parts fixed to it, that is the top plate 5, bottom plate 14, buttress formations 13 and 15, chucks 6 and 16 and components 7 and 17, has its centre of gravity at the centre of the main plate 12. This assembly is counterbalanced by four counterweights 46, each a quarter the weight of the assembly. Each counterweight 46 is coupled to one end of an associated bar 47 by a part-spherical bearing; the other end of each bar 47 being coupled to the main plate 12 by a similar bearing. One or other of the bearings associated with each bar 47 is movable axially with respect to that bar. The centre of each bar 47 is mounted for universal movement in one of a pair of upstanding plates 48 forming part of the base 1.

Each counterweight 46 is also linked to the main plate 12 by four flexible and resilient elements 49 which extend in an unrestricted manner through appropriate openings in the plates 48. As shown in FIG. 5 each element 49 has an enlarged end portion 50 formed with threaded holes parallel with the axis. Bolts 51 extend through holes in the associated counterweight 46. The opposite end of each element 49 is secured to the main plate 12 in a similar manner.

The arrangement is such that when the components 7 and 8 are coaxial the common centre of gravity of the counterweights 46 is co-incident with the centre of gravity of the assembly comprising the main plate 12 and the parts secured to it; further, the bars 49 are straight and unstressed. When the assembly is caused to oscillate, however, the counterweights move in opposition to the assembly and the bars 49 are caused to flex resiliently and to exert a combined restoring force tending to urge the parts back to their original positions. When the assembly is caused to perform irrotational movement in a circular path at a fixed, predetermined speed there is a tendency for the assembly and counterweights to move outwards and increase the diameter of the circular path. The bars 49 are so designed that the restoring force they exert, together with the much smaller restoring forces exerted by the elements 4, 18, 35 and 37, exactly counteract this tendency. As explained above the restoring forces continues to balance the outward forces, irrespectively of the diameter of the circular path.

The assembly comprising the main plate 12, top and bottom plates 5 and 14, buttress formations 13 and 15 and chucks 6 and 16 constitutes the first component support referred to above. The assembly, together with the counterweights 48 constitutes the oscillating means. The elements 35 and 37 constitute the reaction means, and the slides 33 and 36 and the parts pivoted to them constitute the frame means.

Any suitable drive means may be used to cause the oscillation of the oscillating means. One particularly suitable means is fully described and illustrated in the aforementioned applicants' British Patent Application Cognate Nos. 4397/71 and 12271/71; in view of the disclosure in that application the details of the drive means are not repeated here. Another form of drive means which may be used is described and illustrated in the applicants' British Patent Application No. 5625/69 (equivalent to U.S. application Ser. No. 90,685 now U.S. Pat. No. 3,705,678).

Many types of modifications can be made without departing from the scope of the invention.

For example, in place of some or all of the sets of elements 4, 18, 35 and 37 there may be substituted a set of flexible rods formed as a unitary whole from a steel plate with the aid of a milling cutter of special profile. The cutter is caused to form a plurality of spaced parallel grooves in one side of the plate, the grooves extending lengthwise of the plate but their ends being spaced from the ends of the plate. Similar grooves are formed in the other side of the plate, the arrangement being such that the grooves meet to form through slots in the plate, leaving rods of uniform circular cross-section in between the grooves. The ends of the rods are thus integral with the ungrooved end portions of the plate, and further, the end portions of the rods are flared just before they reach these end portions of the plate.

Whatever form the elements take it is important that they should be made fast in such a manner as to avoid as far as possible any tendency for their ends to rock relatively to the parts with which they are fast. If, for example, an element were to comprise a simple cylindrical rod with its end portions fitted into holes in the part with which it is made fast, there would always be the danger that in use the mouths of the holes would start to open out or "bell", the material of the part thus being subjected to fretting corrosion. In general, therefore, it is preferred to form the element with integral extensions at their ends, which extensions are of greater cross-sectional area than the main intermediate portions of the elements and are secured to the associated parts of the apparatus. When the elements are flexed in use the pressures applied by the extensions are therefore decreased and the risk of fretting corrosion is likewise reduced. The extensions may enter holes in the parts to be linked by the elements and may be secured by any suitable means such as by screws (as in the apparatus illustrated), or by adhesives, or by retainers overlapping the margins of the holes and engaging the extensions around the roots of the elements, or by clamping jaws which engages appropriate formations on the sides of the extensions.

In a modified form of the apparatus the slides 33 and 36 are replaced by parts forming parts of the base 1. The triangular plate assembly 39 is omitted, and the piston rod 31 is linked directly to the lugs 45. The reaction to the axial force generated by the piston-and-cylinder unit is then transmitted by the elements 4, 18, 35 and 37 to the base, so that it may be necessary to strengthen the base further to prevent it warping significantly.

The lower elements 18 and 37 would, as before, be in compression. It would, however, be possible to replace them with similar elements extending to the right rather than to the left of the bottom plate 14 as viewed in FIG. 1. Such an arrangement would not be quite so satisfactory as the other because when the main plate 12 moved from its central position its upper end would move very slightly to the left while its lower end would move very slightly to the right, as viewed in FIG. 1. With the arrangement illustrated, of course, the main plate 12 remains parallel with its initial position when moved.

In each of the examples described above each of the individual elements is of relatively substantial cross-sectional area. As indicated in an earlier part of this specification, however, each of the individual elements may be of relatively small cross-sectional area, the elements comprising wires rather than rods. Further, as indicated above, when wires are used the stiffness and resistance to buckling of an assembly of wires is relatively small compared with the stiffness and resistance to buckling of a single rod of the same overall cross-section. Thus, when wires are used they must generally be used in tension and must not generally be used in situations in which they are required to exert restoring forces. Nevertheless, assemblies of wires used as elements may be of value in certain forms of apparatus. For example, the lower set of elements may well be replaced by an assembly of wires in apparatus of the kind in which the lower end of the main plate 12 is located by elements in tension. It is unlikely that the upper set of elements could be similarly replaced, however.

In a typical construction using wire elements there is a pair of spaced rectangular metal plates interconnected by a plurality of individual parallel spaced wires, the ends of each wire entering respective holes in the two plates and being secured there by means such as an adhesive or brazing or the like. With such a construction, however, there is still the danger of fretting corrosion around the mouths of the holes. In another construction there is a pair of spaced parallel bars each provided with a row or rows of upstanding pegs of circular cross-section. One end of a long length of wire is anchored to one of the bars and the wire is then passed to and fro between the bars, extending around the pegs, so that the portions of the wire extending between the wires constitute the elements. Here again, however, there is some danger of fretting corrosion at the places where the wire meets the pegs.

It must be understood that in preferred constructions of apparatus embodying the invention a single element or a group of elements serves to transmit the whole or substantially the whole of the reaction forces from the first component support to the frame means. Nevertheless, it is within the scope of the invention to provide apparatus in which the element or combination of elements transmits only a portion of the reaction forces from the main oscillating mass, the remainder being transmitted through the intermediary of other types of bearings such as hydrostatic bearings.

We claim:

1. Friction welding apparatus of the kind capable of welding a first component and a second component together and comprising frame means, irrotationally moving means movable in an irrotational manner relative to said frame means, a first component support for supporting said first component and constituting part of said irrotationally moving means, a second component support for supporting said second component and restrained against irrotational movement, drive means operative to cause said irrotationally moving means to perform said irrotational movement relatively to said frame means and to said second component support, pressure means operative to generate a force urging said component supports in an axial direction normal to said irrotational movement and such that in use components supported by said component supports are urged together, and reaction means for transmitting from the irrotationally moving means to said frame means the reaction to said force urging said components together, characterised in that the reaction means comprises at least one flexible element one end of which is fast with the frame means so as to be immovable relative to the frame means and the other end of which is fast with the irrotationally moving means so as to be immovable relative to the irrotationally moving means whereby said at least one flexible element is constrained to flex when the irrotationally moving means moves in an irrotational manner.

2. Friction welding apparatus according to claim 1 in which the reaction means comprises at least two spaced, parallel elements each with one end fast with the first component support and the other end fast with the frame means, and both elements being disposed to one side of the place where in use the components abut each other and at different distances from that place.

3. Friction welding apparatus according to claim 2 in which said elements are of the same length and extend in the same direction from the first component support whereby in use one is in compression and the other is in tension, and on irrotational movement the first component support does not tilt.

4. Friction welding apparatus of the kind capable of welding a first component and a second component together and comprising frame means, irrotationally moving means movable in an irrotational manner relatively to said frame means, a first component support for supporting said first component and constituting part of said irrotationally moving means, a second component support for supporting said second component and restrained against irrotational movement, drive means operative to cause said irrotationally moving means to perform said irrotational movement relatively to said frame means and to said second component support, and pressure means operative to generate a force urging the said component supports in an axial direction normal to said irrotational movement and such that in use components supported by said component supports are urged together, characterised in that there is provided restraining means for at least partially counteracting the inertial forces generated by said irrotational movement, which restraining means comprises at least one flexible and resilient element one end of which is fast with the irrotationally moving means and the other end of which is fast with a part relative to which said one end performs irrotational movement when the apparatus is in use, the element being flexed resiliently when the apparatus is in use and exerting forces tending to reduce the amplitude of the irrotational movement.

5. Friction welding apparatus according to claim 4 in which the irrotationally moving means comprises the first component support, counterweight means and coupling means operative between the first component support and the counterweight means to constrain the counterweight means to mirror the irrotationally moving movement of the first component support, the restraining means being operative between the first component support and the counterweight means.

6. Friction welding apparatus of the kind capable of welding a first component and a second component together and comprising a base, irrotationally moving means movable in an irrotational manner relatively to said base, a first component support for supporting said first component and constituting part of said irrotationally moving means, a second component support for supporting said second component and restrained against irrotational movement relative to said base, drive means operative to cause said irrotationally moving means to perform said irrotational movement relatively to said base and to said second component support, pressure means operative to generate a force urging said component supports in an axial direction normal to said irrotational movement and such that in use components supported by said component supports are urged together, and reaction means for transmitting the reaction to said force urging said component supports in an axial direction characterised in that said reaction means does not operate through the intermediary of of said base, and that said first component support is located relatively to said base by at least one flexible element one end of which is fast with said base and the other end of which is fast with said irrotationally moving means.

* * * * *